United States Patent [19]

Schüpbach et al.

[11] Patent Number: 4,922,730
[45] Date of Patent: May 8, 1990

[54] ABSORPTION REFRIGERATING UNIT

[75] Inventors: Reto Schüpbach, Ossingen; Carl U. Wassermann, Künten, both of Switzerland

[73] Assignee: Sibir AG, Switzerland

[21] Appl. No.: 306,545

[22] Filed: Feb. 3, 1989

[30] Foreign Application Priority Data

Feb. 3, 1988 [CH] Switzerland ............................ 376/88

[51] Int. Cl.$^5$ ............................................. F25B 15/00
[52] U.S. Cl. ..................................................... 62/476
[58] Field of Search ......................................... 62/476

[56] References Cited

U.S. PATENT DOCUMENTS

| | | |
|---|---|---|
| 2,267,283 | 2/1938 | Lenning . |
| 2,345,505 | 4/1940 | Siedle . |
| 2,511,851 | 6/1950 | Iwashita . |
| 2,597,778 | 5/1952 | Coons . |
| 2,598,737 | 6/1952 | Grubb et al. . |
| 2,690,059 | 9/1954 | Backstrom . |
| 3,683,640 | 8/1972 | Eber . |
| 4,441,332 | 4/1984 | Wilkinson .................. 62/476 X |
| 4,458,499 | 7/1984 | Grossman .................. 62/476 X |
| 4,551,991 | 11/1985 | Miyoshi et al. ................ 62/476 |
| 4,732,008 | 3/1988 | DeVault ..................... 62/476 X |

FOREIGN PATENT DOCUMENTS 629736  5/1936 Fed. Rep. of Germany .

Primary Examiner—Lloyd L. King
Attorney, Agent, or Firm—Ostrolenk, Faber, Gerb & Soffen

[57] ABSTRACT

An absorption refrigerating unit for refrigerating plural refrigerating compartments. A single pathway of coolant includes a coolant vapor generator, a vapor condenser at the top of the unit, a first partial evaporator for partially evaporating the liquid coolant by absorption of heat, a second partial evaporator, following the first partial evaporator in the coolant pathway, also for partially evaporating the liquid coolant by further absorption of heat. A first of a plurality of secondary cooling systems includes a chamber located at the first partial evaporator at which vapor form second coolant is cooled to liquid form and that liquid second coolant is delivered in a coolant pathway to a first of the refrigerating compartments to be cooled, there to absorb heat and be revaporized to return to the chamber around the first partial evaporator. A separate second one of the secondary cooling systems includes its own chamber and communication to the second refrigerating compartment for cooling the same. A gas heat exchanger is in the coolant pathway between the partial evaporators. The refrigerating compartments are disposed beneath the respective partial evaporators and beneath the condenser.

11 Claims, 4 Drawing Sheets

ABSORPTION REFRIGERATING UNIT

BACKGROUND OF THE INVENTION AND DESCRIPTION OF THE PRIOR ART

The present invention relates to an absorption refrigerating unit with auxiliary gas and particularly to such a unit for cooling a plurality of refrigerating compartments.

Absorption refrigerating units with auxiliary gas are employed for use in refrigerators, particularly for non-electric operation. One embodiment is shown in FIG. 1 of the drawings hereof. In that embodiment, the coolant is expelled from a solution of coolant by feeding heat to it in a generator 1. The coolant vapor passes through the water separator 2 into the condenser 3. The coolant vapor is condensed in the condenser 3, and the liquid is conducted into the evaporator 5, where it evaporates with absorption of heat. In the absorber 4, the evaporated coolant is absorbed again with the liberation of heat by the solution which is lean in coolant.

The arrows shown in FIG. 1 give the direction of the auxiliary gas flow. The auxiliary gas coming from tube 27, into which the coolant evaporates, is a lean gas, which means that the concentration of evaporated coolant in the auxiliary gas is low. In the evaporator 5, the auxiliary gas is enriched by the evaporating coolant and becomes a rich gas.

The auxiliary gas leaving the absorber 4 has now a low concentration of coolant and is therefore a lead gas. It flows through a vertical column 29, which increases the performance of the cooling unit by cooling down the auxiliary gas. Water dropping out of the auxiliary gas runs back either into the absorber 4 or into tube 32. The lean gas flows through tube 27 back to the evaporator 5. There is no coolant and no evaporation in tube 27. A certain amount of lean gas flows from tube 27 through the precooler 30 to a bypass tube 28. The liquid coolant coming from the condenser 3 is cooled down in the precooler 30 by partial evaporation into the auxiliary gas passing the precooler 30 into the bypass tube 28.

The poor solution passing the absorber 4 downward absorbs the ammonia vapor out of the auxiliary rich gas. The solution leaving the absorber into the reservoir 33 is enriched by ammonia. The main part of the solution in the cooling unit is stored in the reservoir 33. The rich solution leaves the reservoir 33 and is transferred through the outer tube 35 of the liquid heat exchanger to the boiler 1. In the boiler 1, the ammonia is driven out of the rich solution by means of heat input. The poor solution leaves the boiler and runs through the inner tube 34 of the liquid heat exchanger back to the top 31 of the absorber 4.

The patent literature, particularly Federal Republic of Germany OS 2,449,372, discloses that instead of arranging the evaporator directly alongside the items to be cooled, the flow of heat from the items to be cooled to the evaporator is obtained through a closed secondary system. The use of an absorption refrigerating unit in the secondary system between the evaporator and the refrigerating compartments in a multi-temperature refrigerator of known construction results in low efficiency of the absorption refrigerating unit, which in turn causes a high consumption of energy by the absorption refrigerating unit.

SUMMARY OF THE INVENTION

The object of the invention is to increase the efficiency of an absorption refrigerating unit having a secondary system and which is used in a multi-temperature, multi-refrigerating compartment absorption unit to decrease the consumption of energy and the operating expenses.

In accordance with the invention, this object is achieved by an absorption refrigerating unit for a multiple refrigerating compartment absorption unit.

There is a main coolant pathway extending from a coolant vapor generator which generates the first coolant vapor by means of a coolant vapor condenser located preferably at the top of the unit. From the coolant vapor generator, the first coolant vapor travels through a coolant vapor condenser which condenses that vapor to liquid form. The first coolant pathway then travels through a plurality of partial evaporators arranged in series. The first of the partial evaporators is connected with the condenser and receives the first coolant liquid. The first partial evaporator causes only a part of the first coolant liquid to evaporate through the absorption of heat while the evaporation also forms auxiliary gas. Following the first partial evaporator in series, there is a second partial evaporator which receives the still liquid first coolant and causes the evaporation of still more of that liquid coolant, again by the absorption of heat. This arrangement may continue through more partial evaporators. Preferably between at least some of the partial evaporators, there is a gas heat exchanger.

For each of the first and second, etc., partial evaporators, there is at least one respective refrigerating compartment which is to be chilled. For the first partial evaporator and its refrigerating compartment, there is a first of the secondary systems. That secondary system comprises a first chamber surrounding the first partial evaporator and a connection in the form of a conduit from the first chamber into the first refrigerating compartment to be cooled. The first chamber and the connection to the first refrigerating compartment comprise a closed circuit, which has in it a second evaporatable coolant. The second coolant in vapor form is chilled and condensed into liquid form at the first partial evaporator by means of the first coolant passing through the first partial evaporator absorbing heat from the second coolant. The liquid second coolant in the first chamber then travels into the first refrigerating compartment where the second liquid coolant is there vaporized and absorbs heat from the first refrigerating compartment for cooling that compartment. The resulting vapor form of the second coolant again moves to the first chamber at the first partial evaporator where it is again condensed. A respective corresponding closed circuit, and the same process and the same result are achieved through successive partial evaporators along the pathway of the first coolant, by respective separate secondary coolant systems each for a respective additional refrigerating compartment.

Preferably, the partial evaporators and secondary systems are such that each temperature of the secondary system that cooperates with the partial evaporator that is further along the pathway of coolant would have a lower temperature.

Preferably, the condenser is disposed at the top of the entire unit. The refrigerating compartments are disposed beneath the condenser. The partial evaporators for each of the refrigerating compartments are disposed above their respective refrigerating compartments, so that the second coolant can flow through the respective connecting circuit into the respective refrigerating compartment. Furthermore, the partial evaporators are disposed beneath the condenser and each partial evaporator in series along the path of the coolant flow is disposed below the preceding partial evaporator in that series.

The secondary circuit for the delivery of the second coolant to the refrigerating compartment and back to the respective partial evaporator comprises a closed circuit for a vaporizeable, condensable liquid coolant. In one embodiment, that circuit comprises a single conduit communicating with the bottom of the chamber at the partial evaporator and extending down to the respective refrigerating compartment. Liquid second coolant flows down that conduit, and vapor returns up that conduit. In another embodiment, the circuit has a liquid exit from the bottom of the chamber at the partial evaporator to a conduit, and the circuit conduit continues around to redeliver vapor to the chamber at the respective partial evaporator above the bottom of the chamber.

Other objects and features of the present invention will become apparent from the following description of the preferred embodiments of the invention considered in conjunction with the accompanying drawings.

DESCRIPTION OF THE PREFERRED EMBODIMENTS

Figure 2:
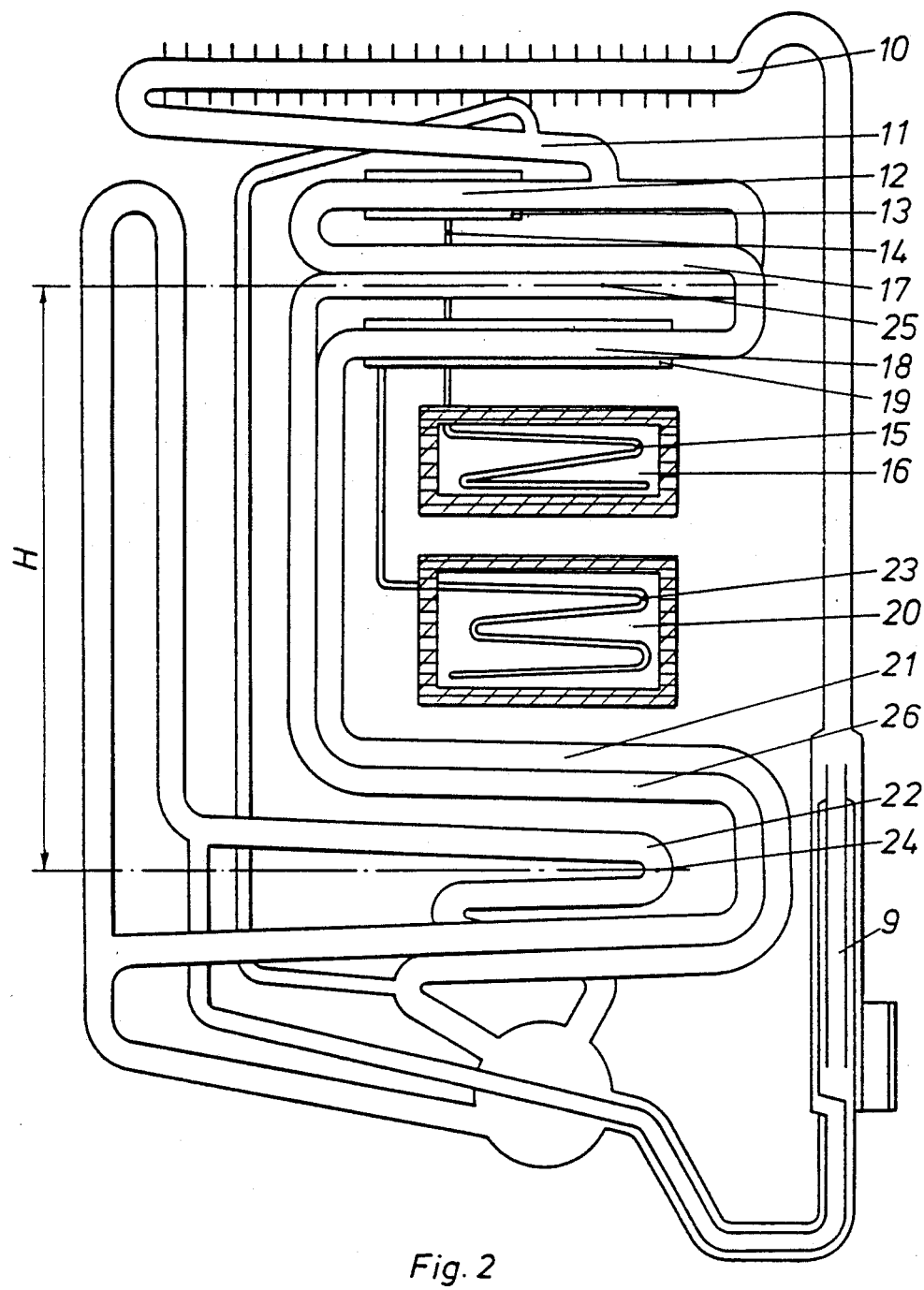
FIG. 2 shows one embodiment of an absorption refrigerating unit in accordance with the invention.

Referring to the embodiment of the invention disclosed in FIG. 2, the coolant vapor produced in a generator 9 is condensed in a condenser 10. The liquid coolant is next precooled in a precooler 11 to the temperature of a first partial evaporator 12. In the first partial evaporator 12, a part of the liquid coolant evaporates, with the accompanying absorption of heat, and forms the auxiliary gas which is lean in coolant.

Figure 3:
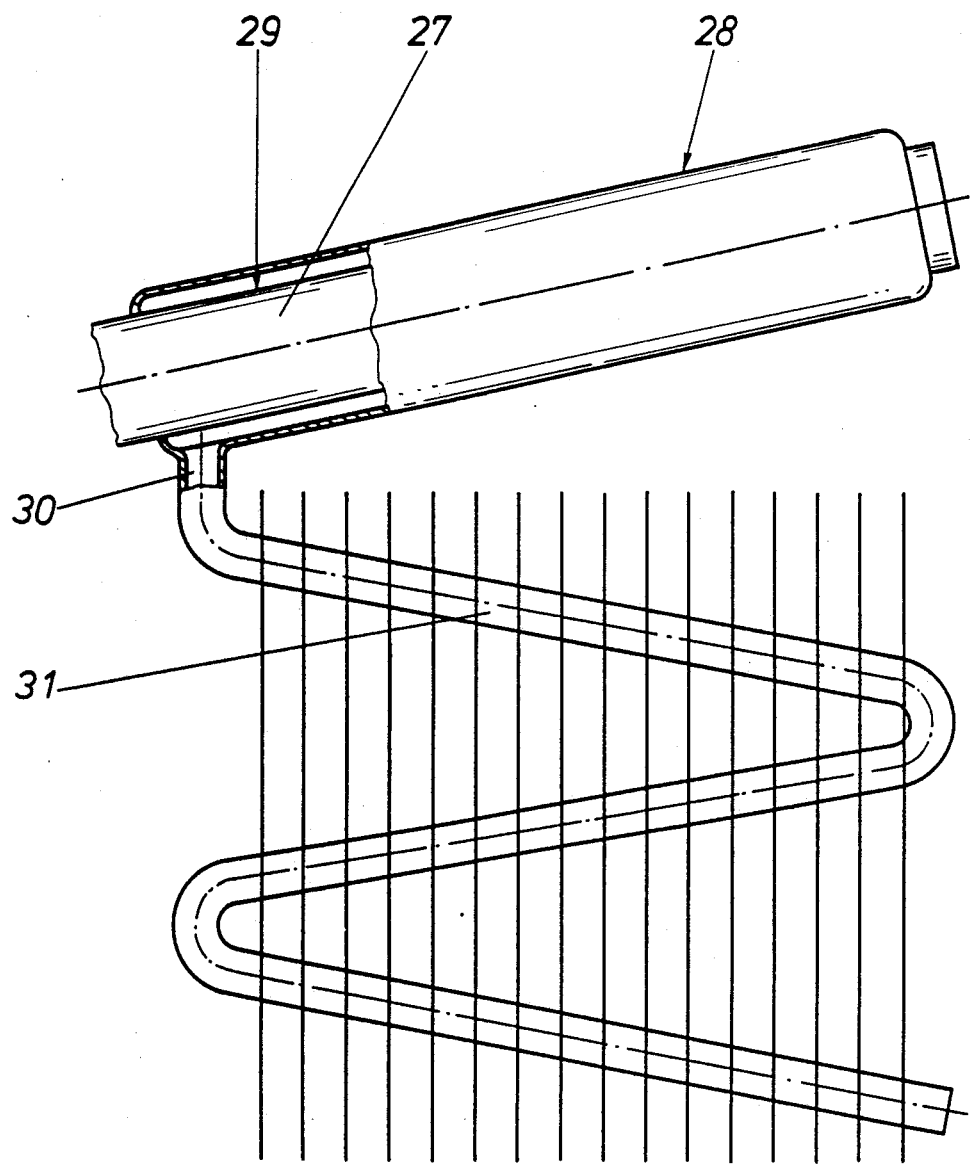
FIG. 3 shows a single-tube secondary system.

In this way, a further coolant, the secondary coolant, is caused to condense on the outside of the partial evaporator 12 in the region of a jacket 13 which surrounds the evaporator 12. The liquid from secondary coolant flows through a line 14 into a secondary evaporator 15 in which the liquid secondary coolant evaporates due to the absorption of heat from the space 16 which is to be cooled and through which the secondary evaporator 15 passes. The evaporated secondary coolant passes again into the jacket 13 of partial evaporator 12 through the line 14. (This is described further below with reference to FIG. 3.) In this way, a temperature T1, which is slightly below the temperature of the space 16, is established in the secondary system of the partial evaporator 12.

The partially liquid and partially already evaporated coolant of the absorption refrigerating unit, which has passed through the evaporator 12, next passes through a gas heat exchanger 17 in which it is heated. It then passes into a second partial evaporator 18 where the portion of the coolant of the absorption refrigerating unit which is still liquid evaporates in whole or in part, with the absorption of heat. The heat necessary for this is fed to the second partial evaporator 18 from a condenser 19 of a second secondary system. The second secondary system operates in a manner similar to the above-described first secondary system of the first partial evaporator 12, in that it removes heat from a refrigerating compartment 20 which is thereby cooled. A temperature T2 which is slightly below the temperature of the refrigerating compartment 20 is thus established in the secondary system.

The auxiliary gas, enriched by the coolant of the absorption refrigerating unit, passes into a heat exchanger 21 in which it is heated.

The advantages of the absorption refrigerating unit of the invention are set forth below.

The last partial evaporator 18 in the direction of flow of the coolant of the absorption refrigerator unit is maintained at a temperature slightly below the temperature of the refrigerating compartment 20 as a result of the feeding of heat by the corresponding secondary system. This partial evaporator 18 has, in accordance with the invention, the highest temperature of all of the partial evaporators in the absorption refrigerating unit. In a typical commercial multitemperature refrigerator, this temperature is about 0° C., corresponding to a refrigerator compartment temperature of 5° C. This temperature at the same time represents the final evaporation temperature of the absorption refrigerating unit, i.e., the highest temperature used in order to produce the refrigerating capacity of the absorption refrigerating unit.

Figure 1:
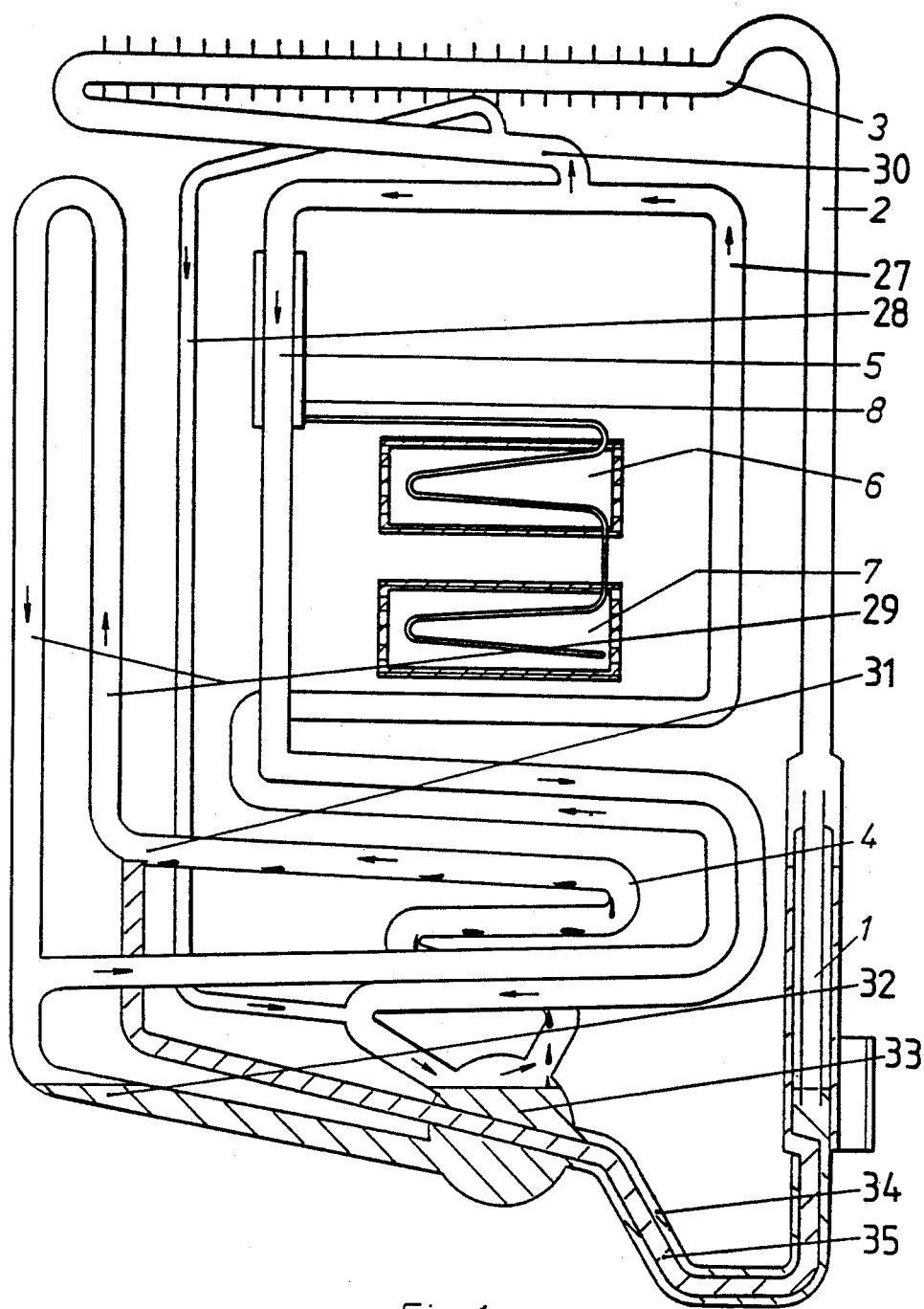
FIG. 1 diagrammatically shows a known absorption refrigerating unit.

In contrast to this, in a secondary system for the transfer of heat from the refrigerating compartments to the evaporator 5 of the absorption refrigerating unit, as shown in prior art FIG. 1, a temperature somewhat lower than the temperature of the coldest refrigerator compartment 6 is established in the evaporator 5. This temperature is at the same time the final evaporation temperature of the absorption refrigerating unit. In a commercial multi-temperature refrigerator, it amounts to about −23° C., corresponding to a refrigerating compartment temperature of −18° C. Upon the use of a secondary system, which is not based on the phase transition of a coolant but in which heat transport takes place by the heating and cooling of a coolant, a higher final evaporation temperature of the absorption refrigerating unit is possible. However, in such case, the conduit cross-sections necessary for the heat transfer in the secondary system are very large due to the low specific heat of the possible coolants, so that the practical use of such a secondary system is unsatisfactory.

The higher final evaporation temperature of the absorption refrigerating unit through the use of several secondary systems in accordance with the invention, as compared with the use of only one secondary system as in prior art FIG. 1, increases the partial pressure of the coolant in the coolant/auxiliary-gas mixture present at the end of the evaporation. The amount of auxiliary gas necessary for a given amount of coolant is thus reduced. Several advantages result from this.

The smaller amount of auxiliary gas circulating per unit of time reduces the unavoidable losses in the gas heat exchanger 21, which, with a given gas heat exchanger, are proportional to the amount of gas circulating per unit of time.

The more strongly enriched auxiliary gas increases the coolant concentration of the solution emerging from an absorber 22. This results, corresponding to the boiling point of the coolant rich solution, in lower temperatures and thus smaller insulation losses at the generator and, furthermore, due to the lesser corrosion at lower temperature, to a longer life of the generator. The higher concentration of the coolant rich solution also increases the efficiency of the generator, which is defined as the ratio of the enthalpy of the stream of coolant vapor produced by the generator to the heat fed to the generator. The efficiency of the generator increases with an increase in the concentration of the rich solution, so that for a given refrigerating capacity of the absorption refrigerating unit, and thus a given amount of coolant vapor to be produced per unit of time from the generator, a smaller amount of heat is necessary, resulting in a lower maintenance cost for the absorption type refrigerating unit.

If an absorption refrigerating unit is controlled by connecting and disconnecting the heating of the generator, then the absorption refrigerating unit is normally in operation 50 percent of the time. During the period of non-operation of the absorption refrigerating unit, the refrigerating compartments 6, 7, 16, 20 heat up, as a result of the insulation losses of the refrigerator unit, until the absorption refrigerating unit is again connected, customarily by the thermostat which is arranged at a suitable place in the refrigerating compartments. During this time, heat transport takes place in case of the use of only one secondary system for the cooling compartments. In the multi-temperature refrigerators of known construction, the colder freezing compartment 6 is normally arranged above the warmer main refrigerating compartment 7, so that heat transport takes place in the secondary system in the tube connecting the two refrigerator compartments. In this connection, secondary coolant vapor flows upward in the tube into the freezing compartment 6. There it condenses with the liberation of heat and flows in liquid phase back into the lower main refrigerating compartment 7 where it evaporates with the absorption of heat. Thus, transport of heat from the main refrigerating compartment 7 to the smaller freezing compartment 6 takes place. Due to the generally lower heat capacity of the smaller freezing compartment 6, as compared with the main refrigerator compartment 7, the freezing compartment 6 heats up faster than the main refrigerating compartment 7, so that, particularly in the case of low outside temperatures of, for instance 10° C., and thus long periods of non-operation of the absorption refrigerating unit, impermissibly high freezing compartment temperatures may periodically result.

By the use in accordance with the invention of at least one secondary system each per refrigerating compartment, these compartments are thermally separated from each other. The heat transport by the insulation from the main cooling compartment 20 (FIG. 2) to the space developed as the freezing compartment 16 is relatively slight, generally about 10 per cent, with respect to the insulation losses of the refrigerating compartment 16, 20. Thus, too rapid heating of the freezing compartment 16 relative to the main refrigerating compartment 20 is avoided during the period of non-operation of the absorption refrigerating unit.

With the arrangement according to the invention of secondary systems between the refrigerating compartments 16, 20 and the partial evaporators 12, 18 of the absorption refrigerating unit, no heat transport by the secondary systems from the refrigerating compartments to the partial evaporators of the absorption refrigerating unit takes place during the period of non-operation of the absorption refrigerating unit.

In order to assure the functioning of the above described secondary systems, the cold side of the secondary system, in this case the corresponding partial evaporator 12, 18 of the absorption refrigerating unit, must be arranged above the warm side of the secondary system, in this case the respective secondary evaporator 15, 23 in the refrigerating compartment. If the corresponding partial evaporator 12, 18 of the absorption refrigerating unit heats up to a temperature higher than that of the corresponding refrigerating compartment 16, 20 during a period of non-operation of the absorption refrigerating unit, then the heat transport in the secondary system automatically terminates since the above condition for the operation of the absorption refrigerating unit is no longer satisfied. The heating of the refrigerating compartments 16, 20 of such a refrigerator during the period of non-operation of the absorption refrigerating unit thus takes place exclusively due to the insulation losses of the housing, due to open refrigerating compartment doors or due to hot items which are introduced. The feeding of heat by secondary systems or the absorption refrigerating unit is negligible.

In the invention, if there are secondary systems between the partial evaporators 12, 18 of the absorption refrigerating unit and the refrigerating compartments 16, 20, a temperature which is somewhat below the temperature of the corresponding refrigerating compartment is established in the secondary systems, as described above. The temperature difference is typically 4° C. The temperature distribution within the secondary system is very slight, due to the high evaporation enthalpy of the halogenated hydrocarbons customarily used as coolant. They vary within a few tenths of a degree. Thus, the tendency of the corresponding secondary evaporator 15, 23 to ice up is reduced. The icing up of a secondary evaporator 15, 23 is possible only with an average refrigerator compartment temperature of less than about 4° C. Furthermore, the formation of ice takes place uniformly over the entire evaporator as a result of the small temperature differences. The formation of a volume of ice at the coldest part of the evaporator, such as frequently occurs in refrigerators with absorption refrigerating units without any or with only one secondary system without phase transition of the coolant, is thus not possible. The uniform ice on the evaporator of the secondary system of the invention is very rapidly thawed upon the heating of the refrigerator compartment 20 to a temperature greater than about 4° C. due to the slight thickness of the layer of ice. Thus, complete, massive icing of the evaporator 23, particularly in the main refrigerator compartment 20, is possible only in extreme and exceptional situations which do not occur in normal operation.

The arrangement in accordance with the invention of a plurality of secondary systems between cooling compartments 16, 20 and evaporators 12, 18 of the absorption refrigerating unit permits the physical separation of evaporators 12, 18 and refrigeration compartments 16, 20. In particular, it is possible to arrange the evaporators 12, 18 as high as possible. The highest possible arrangement of the evaporators is established by the condenser 10 and the precooler 11. As shown in FIG. 2, the evaporators 12, 18 of the absorption refrigerating unit can be arranged directly below the condenser 10. With the same outside dimension, there results therefrom a maximum distance H between the center of the absorber 24, which represents approximately the geometric center of the absorption, and the geometric center of the evaporation 25. The geometric center of the evaporation 25 is a fictitious point which, with respect to the drive of the gas circuit, behaves the same as the distributed evaporation in the partial evaporators 12, 18. The same applies to the center point of the absorber 24. By the maximum spacing H there is obtained a maximum drive force for the auxiliary gas circuit. The drive force of the auxiliary gas circuit results first of all from the differences in density between auxiliary gas which is rich in coolant and flows from the evaporator 12, 18 into the absorber 22 and the auxiliary gas which is lean in coolant and flows through the line 26 from the absorber into the evaporators 12, 18, as well as from the height of the rich and lean gas columns, which are proportional to the average distance H between evaporators and absorbers. The amount of auxiliary gas circulating per unit of time depends on the ratio of the pressure drop dP in the auxiliary gas circuit to the driving force H and reaches an optimum for a given ratio.

If the pressure drop dP at ambient pressure 10 is measured with a volumetric flow of 100 liters of air per hour and the height H in meters, then the optimal ratio H/dP for a desired ideal amount of auxiliary gas per unit of time is about 0.25.

With an increase in the average spacing H by the highest possible arrangement of the evaporators 12, 18, the pressure drop in the auxiliary gas circuit can be increased proportionately for a constant ratio of H/dP. The increase in the pressure drop permits smaller gap thickness in the auxiliary gas circuit, which both improves the heat transfers and also reduces the average diffusion path in the evaporators 12, 18 and absorber 22. In this way, the losses upon the heat transfer in evaporators 12, 18, gas heat exchangers 17, 21 and absorber 22 are reduced and the evaporation and absorption improved For the design of the secondary systems, which are based on phase transition of a secondary coolant, at least two different embodiments are possible. The technically simplest solution is the so-called "single-tube system". It is shown by example in FIG. 3. In this case, a jacket 28 is arranged around a tubular evaporator 27 and is sealed off airtight from the environment. This produces a hollow cylindrical space between the jacket 28 and the evaporator 27. That space is filled with a gaseous coolant, for instance halogenated hydrocarbon. By the evaporation within the evaporator 27, the temperature on the surface of the evaporator tube 29 drops causing condensation of the coolant there. The liquid coolant flows off on the evaporator 27 of the absorption refrigeration unit and flows into the transporter tube 30 which is connected at the lowest point of the jacket 28. The transport tube 30 passes with continuous gradient into a secondary evaporator tube 31 which is arranged within the refrigerator compartment to be cooled. In tube 31, the liquid coolant evaporates with the absorption of heat. The gaseous coolant flows back within the same transport tube 30 into the jacket 28. The velocity of flow of the gaseous coolant should not exceed a maximum of about 1–1.5 m/sec, in order not to prevent the flow of the liquid coolant on the bottom of the tube. This can be achieved by sufficiently large tube cross-sections or by high vapor pressure of suitable coolants. By using coolants of high evaporation enthalpies, this temperature difference between the coldest and hottest points of the secondary system can be kept within a few tenths of a degree.

Figure 4:
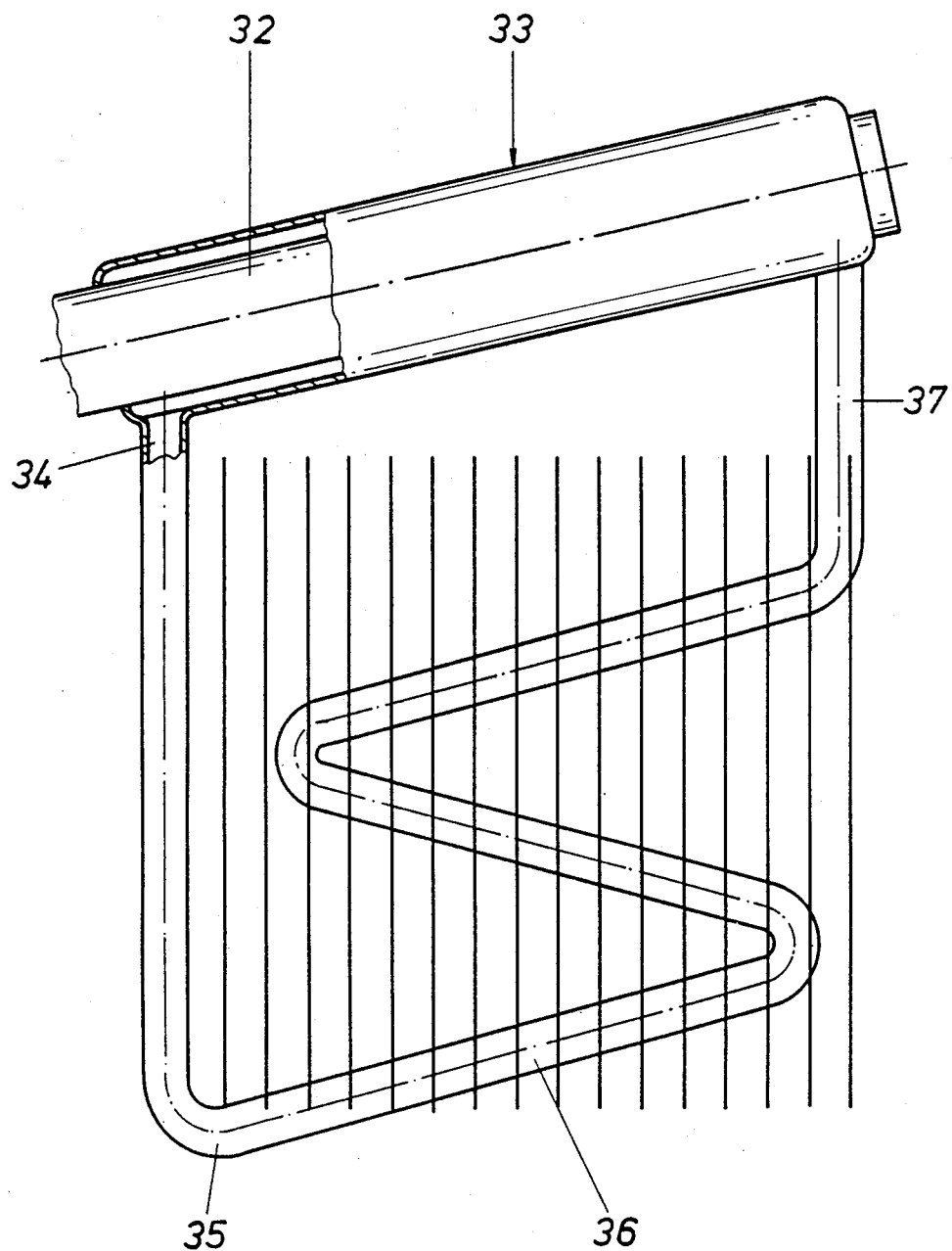
FIG. 4 shows a two-tube secondary system.

Another possibility is a two-tube secondary system, shown by example in FIG. 4. It differs from the single tube system by the separate guidance from liquid to gaseous phase of the coolant. In this case, coolant is condensed at the evaporator 32 of the absorption refrigeration unit within the jacket 33 and the coolant flows through a first transport tube 34 by gradient to the lowest point 35 of the secondary evaporator 36 which is arranged in the refrigeration compartment. There the coolant evaporates with the absorption of heat and flows back through a second transport tube 37 into the jacket 33. The two-tube system may employ smaller tube cross-sections than the single tube system but is more complicated in construction.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. An absorption refrigerating unit comprising:
    a coolant vapor generator for generating a first coolant vapor; a coolant vapor condenser connected with the coolant vapor generator for receiving the coolant vapor and for condensing the first coolant to a liquid;
    a first partial evaporator connected with the condenser for receiving the first coolant liquid therefrom and for causing only a part of the first coolant liquid to evaporate and to thereby absorb heat while evaporating, forming auxiliary gas;
    a second partial evaporator connected with the first partial evaporator for causing the first coolant which is still liquid and that enters the second partial evaporator from the first partial evaporator to at least in part evaporate with the absorption of heat;
    a gas heat exchanger between the first and second partial evaporators along the pathway of the first coolant;
    a first refrigerating compartment; a first secondary system comprising a first chamber for delivering a second coolant outside the first partial evaporator for the second coolant in the first chamber of the first secondary system to give up its heat to the first partial evaporator for cooling the second coolant in the first secondary system; a first connection between the first refrigerating compartment and the first chamber for transmitting cooled second coolant from the first chamber to the first refrigerating compartment for cooling the first refrigerating compartment;
    a second refrigerating compartment; a second secondary system comprising a second chamber for delivering a third coolant outside the second partial evaporator for the third coolant in the second chamber of the second secondary system to give up its heat to the second partial evaporator for cooling the third coolant in the second secondary system; and a second connection between the second refrigerating compartment and the second chamber for transmitting cooled third coolant from the second chamber to the second refrigerating compartment for cooling the second refrigerating compartment;

the refrigerating compartments, the first and second partial evaporators and the respective secondary systems being designed so that the first and second partial evaporators operate at different temperatures.

2. The unit of claim 1, wherein each of the first and second connections of the respective first and second secondary systems comprise a liquid and vapor conduit system which extends from the first and second chambers at the respective first and second partial evaporators to the respective first and second refrigerating compartments for cooling the respective refrigerating compartments and for permitting return to the respective chambers at the respective partial evaporators of vapor which has absorbed heat from the respective refrigerating compartments.

3. The unit of claim 2, wherein the partial evaporators are such that the temperature of the secondary system that cooperates with the partial evaporator that is further along the pathway of coolant has a lower temperature.

4. The unit of claim 1, wherein the condenser is disposed at the top of the unit, the refrigerating compartments are disposed beneath the condenser and the partial evaporators for each of the refrigerating compartments are disposed above the respective refrigerating compartment.

5. The unit of claim 4, wherein the partial evaporators are disposed closely beneath the condenser, with each partial evaporator in series along the path of the first coolant being disposed below the preceding partial evaporator in that series.

6. An absorption refrigerating unit comprising:
a coolant vapor generator for generating a first coolant vapor; a coolant vapor condenser connected with the coolant vapor generator for receiving the coolant vapor and for condensing the first coolant to a liquid;
a first partial evaporator connected with the condenser for receiving the first coolant liquid therefrom and for causing only a part of the first coolant liquid to evaporate and to thereby absorb heat while evaporating, forming auxiliary gas;
a second partial evaporator connected with the first partial evaporator for causing the first coolant which is still liquid and that enters the second partial evaporator from the first partial evaporator to at least in part evaporate with the absorption of heat;
a first refrigerating compartment; a first secondary system comprising a first chamber for delivering a second coolant outside the first partial evaporator for the second coolant in the first chamber of the first secondary system to give up its heat to the first partial evaporator for cooling the second coolant in the first secondary system; a first connection between the first refrigerating compartment and the first chamber for transmitting cooled second coolant from the first chamber to the first refrigerating compartment for cooling the first refrigerating compartment;
a second refrigerating compartment; a second secondary system comprising a second chamber for delivering a third coolant outside the second partial evaporator for the third coolant in the second chamber of the second secondary system to give up its heat to the second partial evaporator for cooling the third coolant in the second secondary system; and a second connection between the second refrigerating compartment and the second chamber for transmitting cooled third coolant from the second chamber to the second refrigerating compartment for cooling the second refrigerating compartment;

the refrigerating compartments, the first and second partial evaporators and the respective secondary systems being designed so that the first and second partial evaporators operate at different temperatures;

wherein each of the first and second connections of the respective first and second secondary systems comprise a liquid and vapor conduit system which extends from the first and second chambers at the respective first and second partial evaporators to the respective first and second refrigerating compartments for cooling the respective refrigerating compartments and for permitting return to the respective chambers at the respective partial evaporators of vapor which has absorbed heat from the respective refrigerating compartments;

at least one of the liquid and vapor conduit systems of at least one of the secondary systems comprises the respective chamber of the respective partial evaporator having a bottom side and the conduit system comprising a liquid carrying conduit extending from the bottom side of the chamber into the refrigerating compartment for transmitting condensed second coolant from the respective chamber into the respective refrigerating compartment and for also transmitting along the conduit the gaseous vapor which is formed upon absorption of heat by the secondary coolant in the respective refrigerating compartment.

7. An absorption refrigerating unit comprising:
a coolant vapor generator for generating a first coolant vapor; a coolant vapor condenser connected with the coolant vapor generator for receiving the coolant vapor and for condensing the first coolant to a liquid;
a first partial evaporator connected with the condenser for receiving the first coolant liquid therefrom and for causing only a part of the first coolant liquid to evaporate and to thereby absorb heat while evaporating forming auxiliary gas;
a second partial evaporator connected with the first partial evaporator for causing the first coolant which is still liquid and that enters the second partial evaporator from the first partial evaporator to at least in part evaporate with the absorption of heat;
a first refrigerating compartment; a first secondary system comprising a first chamber for delivering a second coolant outside the first partial evaporator for the second coolant in the first chamber of the first secondary system to give up its heat to the first partial evaporator for cooling the second coolant in the first secondary system; a first connection between the first refrigerating compartment and the first chamber for transmitting cooled second coolant from the first chamber to the first refrigerating compartment for cooling the first refrigerating compartment;
a second refrigerating compartment; a second secondary system comprising a second chamber for delivering a third coolant outside the second partial evaporator for the third coolant in the second chamber of the second secondary system to give up its heat to the second partial evaporator for cooling the third coolant in the second secondary system; and a second connection between the second refrigerating compartment and the second chamber for transmitting cooled third coolant from the second chamber to the second refrigerating compartment for cooling the second refrigerating compartment;

the refrigerating compartments, the first and second partial evaporators and the respective secondary systems being designed so that the first and second partial evaporators operate at different temperatures;

wherein each of the first and second connections of the respective first and second secondary systems comprise a liquid and vapor conduit system which extends from the first and second chambers at the respective first and second partial evaporators to the respective first and second refrigerating compartments for cooling the respective refrigerating compartments and for permitting return to the respective chambers at the respective partial evaporators of vapor which has absorbed heat from the respective refrigerating compartments;

wherein at least one of the liquid and vapor conduit systems of at least one of the secondary systems comprises the respective chambers of the respective partial evaporator having a bottom side and the conduit system comprising a liquid carrying conduit extending from the bottom side of the chamber into the refrigerating compartment for transmitting condensed secondary coolant from the respective chamber into the respective refrigerating compartment;

the respective chamber further having a portion having its bottom portion; the one conduit system continuing through the refrigerating compartment and back to the respective chamber and entering the chamber for defining a closed circuit from the bottom of the chamber through the conduit back to the chamber and wherein the condensed secondary coolant travels from the bottom of the respective chamber through the conduit and the reformed second coolant vapor travels along the conduit and into the chamber above the bottom part.

8. The unit of claim 7, wherein the respective chamber is generally inclined along the length of the respective partial evaporator so that the bottom part of that chamber is at the lower end of the inclined chamber.

9. The unit of claim 7, wherein the respective chamber is generally inclined along the length of the respective partial evaporators so that the bottom part that of that chamber is at the lower end of the inclined chamber; in the refrigerating compartment, the conduit system being inclined upwardly from the part thereof communicating with the bottom part of the chamber toward the part thereof communicating to the part of the chamber above the bottom part, so that second liquid from the respective chamber travels into the conduit system while only gaseous vapor is enabled to travel up the conduit system back to the respective chamber.

10. The unit of claim 9, wherein the refrigerating compartment and the conduit system leading to the refrigerating compartment from the chamber are below the chamber.

11. The unit of claim 7, wherein the refrigerating compartment and the conduit system leading to the refrigerating compartment from the chamber are below the chamber.

* * * * *